(12) United States Patent
Griffin et al.

(10) Patent No.: US 11,987,345 B2
(45) Date of Patent: May 21, 2024

(54) METHODS AND APPARATUS FOR VARIABLE STIFFNESS SUPPORTS IN AIRCRAFT TESTING

(71) Applicant: The Boeing Company, Chicago, IL (US)

(72) Inventors: Steven F. Griffin, Kihei, HI (US); Eric Y. Reichenbach, Saint Louis, MO (US)

(73) Assignee: The Boeing Company, Arlington, VA (US)

( * ) Notice: Subject to any disclaimer, the term of this patent is extended or adjusted under 35 U.S.C. 154(b) by 168 days.

(21) Appl. No.: 17/857,518

(22) Filed: Jul. 5, 2022

(65) Prior Publication Data

US 2024/0010329 A1 Jan. 11, 2024

(51) Int. Cl.
*B64C 25/62* (2006.01)
*B64F 5/60* (2017.01)

(52) U.S. Cl.
CPC .............. *B64C 25/62* (2013.01); *B64F 5/60* (2017.01)

(58) Field of Classification Search
CPC ................................. B64C 25/62; B64F 5/60
See application file for complete search history.

(56) References Cited

U.S. PATENT DOCUMENTS 10,309,867 B2 * 6/2019 Hovik .................... G01M 9/04
10,539,201 B2 * 1/2020 Griffin .................. F16F 7/1011

* cited by examiner

*Primary Examiner* — Xiao En Mo
(74) *Attorney, Agent, or Firm* — HANLEY, FLIGHT & ZIMMERMAN, LLC

(57) ABSTRACT

Methods and apparatus for variable stiffness supports in aircraft testing are disclosed. A disclosed example apparatus includes a variable stiffness support including a pad to contact and support the aircraft, and a spring operatively coupled to the pad. The apparatus also includes an actuator operatively coupled to the support, a sensor, at least one memory, machine executable instructions and at least one processor. The at least one processor is to execute the instructions to determine at least one of a movement or a displacement of the pad based on information from the sensor, and control movement of the actuator based on the determined at least one movement or distance of the pad to statically support the aircraft while enabling movement of the pad above a threshold frequency.

22 Claims, 11 Drawing Sheets

US 11,987,345 B2

METHODS AND APPARATUS FOR VARIABLE STIFFNESS SUPPORTS IN AIRCRAFT TESTING

FIELD OF THE DISCLOSURE

This disclosure relates generally to aircraft testing and modeling, and, more particularly, to methods and apparatus for variable stiffness supports in aircraft testing.

BACKGROUND

Ground-based aircraft testing systems have been employed to test operation of an aircraft in contrast to in-flight testing, which can be expensive and time-consuming. In particular, the aircraft can be supported and/or suspended on the ground to simulate flight conditions while data pertaining to the aircraft is obtained. For example, the data can be obtained by these systems to develop a transfer function between control/input and resultant behavior of the aircraft in response thereto.

SUMMARY

An example apparatus includes a variable stiffness support including a pad to contact and support the aircraft, and a spring operatively coupled to the pad. The apparatus also includes an actuator operatively coupled to the support, a sensor, at least one memory, machine executable instructions and at least one processor. The at least one processor is to execute the instructions determine at least one of a movement or a displacement of the pad based on information from the sensor, and control movement of the actuator based on the determined at least one movement or distance of the pad to statically support the aircraft while enabling movement of the pad above a threshold frequency.

An example non-transitory computer readable medium comprising instructions, which when executed, cause at least one processor to: determine at least one of a movement or a displacement of a pad of a variable stiffness support based on information from a sensor, the pad to contact and support an aircraft, and operatively coupled to a spring, and control movement of an actuator operatively coupled to at least one of the pad or the aircraft based on the determined at least one of the movement or the displacement of the pad to statically support the aircraft while enabling movement of the pad above a threshold frequency.

An example method includes determining, by executing instructions with at least one processor, at least one of a movement or a displacement of a pad of a variable stiffness support based on information from a sensor, the pad to contact and support an aircraft, and operatively coupled to a spring, and control movement of an actuator operatively coupled to at least one of the pad or the aircraft based on the determined at least one of the movement or the displacement of the pad to statically support the aircraft while enabling movement of the pad above a threshold frequency.

Figure 1:
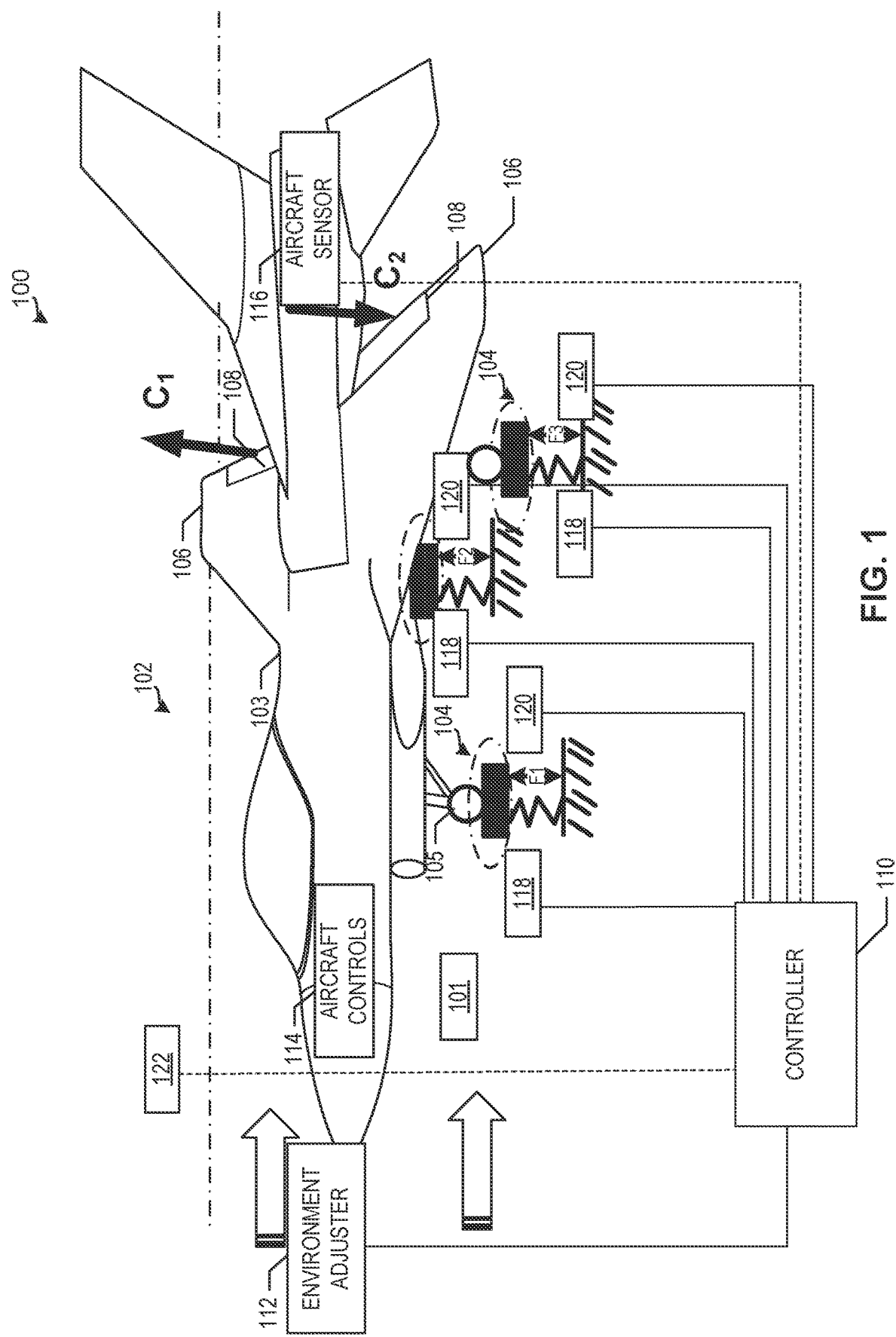
FIG. 1 is an example variable stiffness support testing system in accordance with teachings of this disclosure.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component.

As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Methods and apparatus for variable stiffness supports in aircraft testing are disclosed. Some known ground-based testing systems utilize a fully-functioning aircraft to test operation thereof. For example, the aircraft can be supported and/or suspended (e.g., in a building and/or a wind tunnel) while data corresponding to operation and/or characteristics of the aircraft is obtained. Particularly, the data can be obtained to develop a transfer function between pilot controls/input and resultant behavior of the aircraft in response to the pilot controls/input. Some known aircraft testing systems implement airbags or other supports to simulate flight. In particular, the airbags are placed at a bottom surface/portion and/or landing gear of the aircraft to enable the aircraft to move (e.g., pivot, rotate, roll, etc.) while the airbags provide static support to the aircraft from the ground. In other words, the airbags can be utilized for simulation of flight conditions for the aircraft while statically supporting the aircraft. However, the airbags are limited as to how accurately they can simulate the flight conditions (while statically supporting the aircraft). Further, the airbags can cause unpredictable and/or uncontrolled movement of the aircraft. Some known systems herein utilize soft springs, which can be expensive to implement and pose some difficulty in maintaining sufficient vertical static support while being sufficiently movable and/or flexible to simulate flight conditions to a requisite degree of accuracy.

Examples disclosed herein can advantageously simulate flight conditions of an aircraft and/or test the aircraft while effectively statically supporting the aircraft with supports. Particularly, examples disclosed herein can support the aircraft in a relatively stable state when the aircraft is being positioned thereon while enabling the aircraft to move and/or displace at certain frequencies. As a result, examples can enable highly accurate data pertaining to the aircraft to be obtained in ground-based testing, thereby saving cost and time associated with testing the aircraft. Further, examples disclosed herein can be relatively easy to implement.

Examples disclosed herein utilize a variable stiffness support to test an operational aircraft. According to examples disclosed herein, the variable stiffness support can include a pad (e.g., a contact pad, a support pad, etc.) to contact and support the aircraft, and a spring operatively coupled to the pad. Examples disclosed herein also include at least one memory, instructions, and at least one processor. In particular, the at least one processor is to determine at least one of a movement or a distance of the pad based on information from a sensor, and control movement of an actuator operatively coupled to the support based on the determined at least one of the movement and/or the distance of the pad such that motion of the pad above a threshold frequency is enabled or permitted. The aforementioned actuator can be controlled to prevent and/or cancel out motion and/or movement of the pad less than a threshold frequency, such as 1 Hertz (Hz), for example. In other words, the actuator can operate as and/or include a high pass filter that transfers displacement and/or motion associated with periodic and/or oscillatory motion above a threshold frequency, for example.

In some examples, the pad is actuated and/or controlled such that the pad is maintained at approximately a mean height corresponding to a sinusoidal and/or periodic motion of at least a portion of the aircraft resulting from movement of a control surface of the aircraft. Additionally or alternatively, the pad is actuated and/or controlled by the actuator for cancelling of the spring such that the spring is compressed or relaxed by the actuator to vary and/or maintain an amount of force of the spring acting on the aircraft (e.g., acting on a landing gear strut or wheel of the aircraft) while enabling the spring to respond to motion meeting and/or exceeding the aforementioned threshold frequency. In some examples, the actuator is coupled and/or mounted to a landing gear of the aircraft. In some examples, the at least one processor determines whether the aircraft (e.g., a landing gear portion of the aircraft) is positioned on the pad.

As used herein, the terms "spring canceling" and similar terms refer to a control operation of a spring such that a stiffness of the spring is canceled and/or diminished based on a control loop (e.g., a feedback signal related to the control loop).

FIG. 1 is an example variable stiffness support testing system 100 in accordance with teachings of this disclosure. The variable stiffness support testing system 100 of the illustrated example is shown with a ground/floor surface 101 that supports an aircraft 102 prior to the aircraft 102 being moved onto the variable stiffness support testing system 100. In this example, the aircraft 102 includes a fuselage 103 and a landing gear 105 supported by variable stiffness supports 104, of which operations are described in greater detail below in connection with FIGS. 2-6. Further, the aircraft 102 also includes wings 106 with corresponding control surfaces (e.g., flaps, flaperons, ailerons, etc.) 108. The example variable stiffness support testing system 100 includes a controller 110 that controls the variable stiffness supports 104. The example controller 110 is communicatively coupled to an environment adjuster (e.g., a wind tunnel fan) 112, aircraft controls 114, an aircraft sensor 116, as well as sensors 118 and actuators (e.g., differential actuators, hydraulic actuators, pneumatic actuators, voice coils (electromechanical, lead/ball screw with DC motor, etc.) 120 associated with the respective variable stiffness supports 104. In some other examples, the controller 110 is only communicatively coupled to the sensors 118 and the actuators 120.

According to examples disclosed herein, to test operation and/or determine flight characteristics of the aircraft 102, the control surfaces 108 are moved in a periodic and/or sinusoidal motion, as generally indicated by labels "C1" and "C2" in FIG. 1, based on inputs provided to the aircraft controls 114. In turn, information associated with resultant movement (e.g., resultant periodic movement) of the aircraft 102 is measured by the aircraft sensor 116, for example. In some examples, the aforementioned information is utilized to develop a transfer function between inputs provided to the aircraft controls 114 and resultant motion of the aircraft 102. In some examples, air is blown onto the aircraft 102 by the example environment adjuster 112 while the control surfaces 108 are moved (e.g., periodically moved, oscillated, etc.). In some such examples, the air is blown onto the aircraft via the wind tunnel such that the aircraft 102 can move (e.g., via a suspension and/or suspension system) in response to frequencies above a threshold frequency.

To statically support the aircraft 102 relative to the ground surface 101 while testing the aircraft 102 and/or simulating conditions associated with flight of the aircraft 102, the variable stiffness supports 104 maintain the aircraft 102 relative to the ground surface 101 at a baseline (e.g., a mean) height therebetween while enabling the aircraft 102 to move relative to the baseline height (e.g., in an oscillatory motion). In this particular example, when the control surfaces 108 are moved in a periodic and/or oscillatory motion, at least a portion of the aircraft 102 (e.g., a landing gear and/or wheel of the aircraft 102) is caused to move in a resultant motion while the aircraft 102 is statically supported by the variable stiffness supports 104. In other words, examples disclosed herein enable accurate data collection and/or simulation of flight conditions (e.g., external flight conditions) of the aircraft 102 while supporting the aircraft 102 relative to the ground or floor (e.g., to a relative frame such as the building and/or a room of the building, etc.).

In some examples, a sensor 122 is implemented to determine a presence and/or alignment of the aircraft 102 and/or at least a portion of the aircraft 102 with the variable stiffness supports 104. In particular, the sensor 122 can determine whether the aircraft 102 is positioned so that the aircraft 102 can be statically supported by the variable stiffness supports 104. In turn, the variable stiffness supports 104 can be operated to simulate flight of the aircraft 102.

Figure 2:
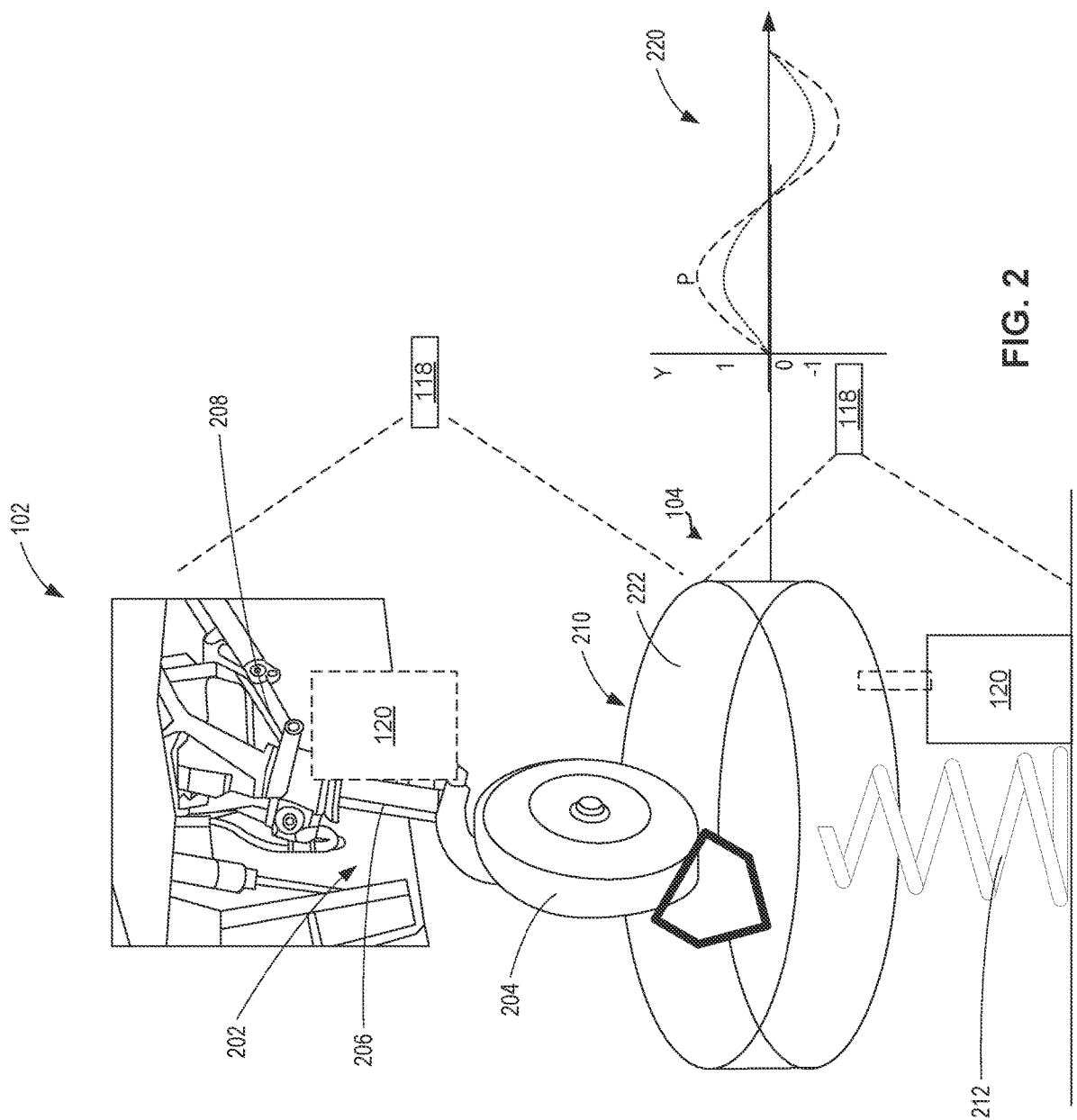
FIG. 2 is a detailed view of a portion of the example variable stiffness support testing system of FIG. 1.

FIG. 2 is a detailed view of a portion of the example variable stiffness support testing system 100 of FIG. 1. According to the illustrated example of FIG. 2, the example aircraft 102 includes a landing gear strut 202 which, in turn, includes a wheel 204, a vertical support 206, and a folding apparatus 208. In this example, the landing gear strut 202 and/or the wheel 204 is supported by the variable stiffness support 104 which, in turn, includes a pad 210 and a spring 212. In the illustrated example, the pad 210 and the spring 212 are operatively coupled to the actuator 120 such that movement of the actuator 120 causes at least the pad 210 to displace. Further, at least one of the sensors 118 is shown in the illustrated example of FIG. 2.

To statically support the aircraft 102 relative to a building or other stationary structure, the actuator 120 is controlled with a feedback loop. In one particular example, the actuator 120 is controlled to move and/or displace the pad 210 in a vertical direction (upward or downward in the view of FIG. 2) to maintain the aircraft 102 at a relatively static height with respect to the ground and/or structures of a building while the aircraft 102 is allowed to move in response to frequencies above a threshold frequency (e.g., above 0 Hz, 1 Hz, 5 Hz, 10 Hz, 20 Hz, 50 Hz, etc.), as generally indicated by a graph 220. In some such examples, the sensor 118 measures a height, movement and/or vertical displacement of the pad 210 such that the pad 210 is moved by the actuator 120 to cancel and/or diminish motion at frequencies lower than the threshold frequency. As a result, the aircraft 102 is statically supported while being allowed to move and/or oscillate at frequencies above the threshold based on information from the sensor 118. Additionally or alternatively, the actuator 120 is controlled to vary and/or adjust a degree to which the spring 212 can counteract and/or dampen movement of the pad 210. For example, in response to a detected displacement, degree of compression and/or force of the spring 212, the actuator 120 is controlled to counteract a force of the spring 212 acting on the pad 210. In other words, the example actuator 120 can be operated to counteract and/or cancel the spring 212, thereby enabling the pad 210 to move in an oscillatory and/or vibratory motion that is above the threshold frequency. In some examples, a combination of a height (e.g., a relative height) of the pad 210 in conjunction with a state (e.g., a state of compression and/or deflection) of the spring 212 is utilized to direct and/or control movement of the pad 210 via the actuator 120.

In some examples, the sensor 118 measures a height between the aircraft 102 (e.g., a bottom surface of the aircraft 102) and a contact surface 222 of the pad 210. In some examples, the actuator 120 is part of and/or coupled to the landing gear strut 202. In some examples, the sensor 118 includes a linear sensor, a position sensor, an LVDT linear sensor or potentiometer, eddy current, Hall effect, resistive, DC accelerometer, etc. In some examples, the pad 210 is moved and/or controlled by the actuator 120 to maintain a degree of compression of the spring 212 such that an end of the spring 212 is maintained at substantially (e.g., within 5%) a center of travel of the spring 212. Additionally or alternatively, a height or end of the spring 212 is maintained at a desired range.

Figure 3:
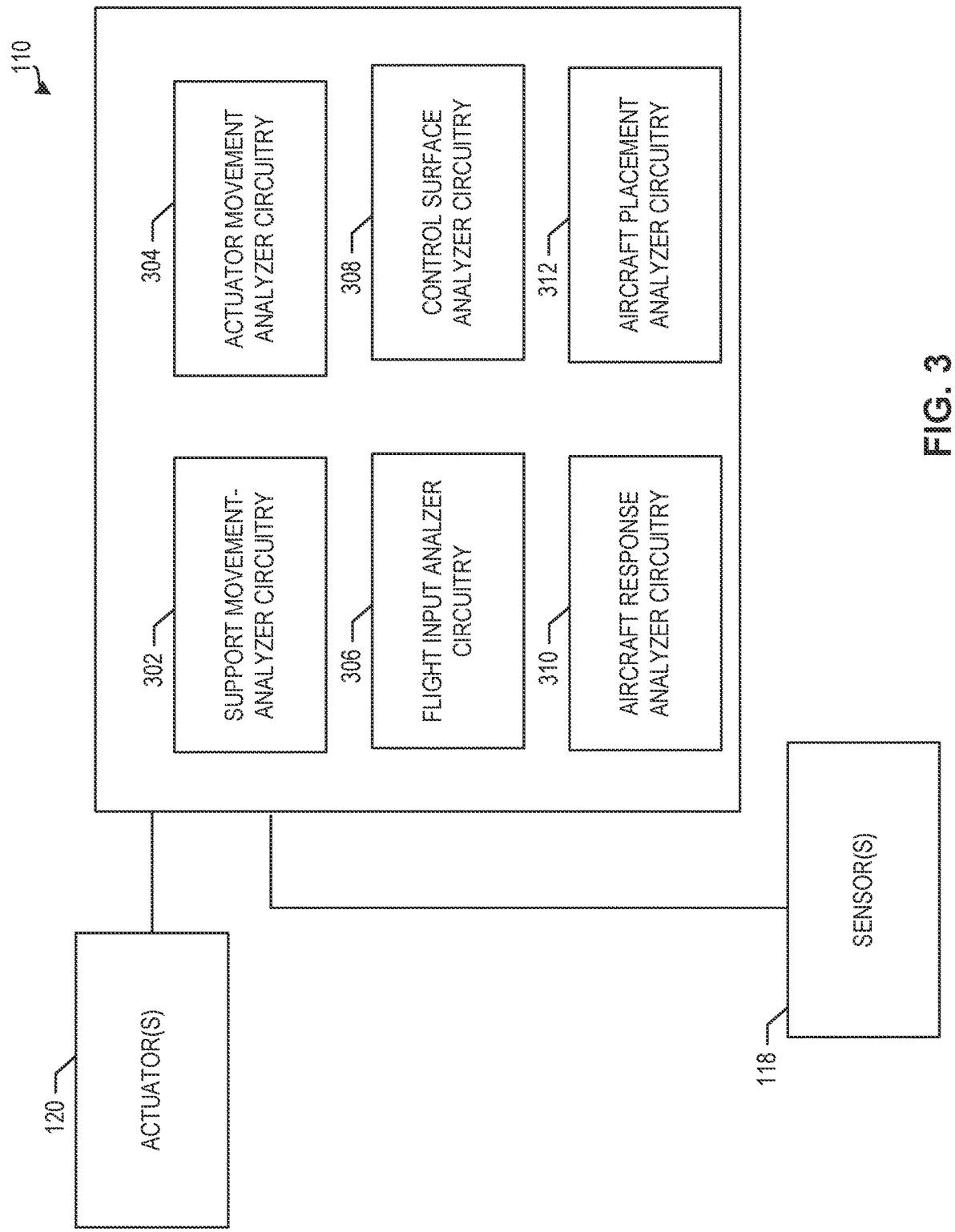
FIG. 3 is a block diagram of an example controller of the example variable stiffness support testing system of FIG. 1.

FIG. 3 is a block diagram of the example controller 110 to control movement of the pad 210 via the actuator 120. The example controller 110 of FIG. 3 may be instantiated (e.g., creating an instance of, bring into being for any length of time, materialize, implement, etc.) by processor circuitry such as a central processing unit executing instructions. Additionally or alternatively, the example controller 110 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

According to the illustrated example, the controller 110 includes example support movement analyzer circuitry 302, example actuator movement analyzer circuitry 304, example flight input analyzer circuitry 306, control surface analyzer circuitry 308, example aircraft response analyzer circuitry 310 and example aircraft placement analyzer circuitry 312. In this example, the controller 110 is communicatively coupled to the sensor(s) 118 and the actuator(s) 120.

The support movement analyzer circuitry 302 of the illustrated example is utilized to analyze and/or determine a movement of the pad 210. In particular, the example support movement analyzer circuitry 302 can determine whether the pad 210 is statically supporting a weight of the aircraft 102 by determining and/or monitoring a baseline/mean height and/or a periodic center height of the pad 210 as the pad 210 moves in an oscillatory and/or periodic manner. Additionally or alternatively, the example support movement analyzer circuitry 302 analyzes and/or determines a condition of the spring 212 supporting the pad 210. For example, the support movement analyzer circuitry 302 determines a compression of the spring 212, a force output of the spring 212 and/or an amount of movement of the spring 212 relative to its range of movement, etc. In some examples, the support movement analyzer circuitry 302 is instantiated by processor circuitry executing movement analyzer circuitry instructions and/or configured to perform operations such as those represented by the flowcharts of FIGS. 4-6.

The example actuator movement analyzer circuitry 304 is implemented to control and/or direct the actuator based on information and/or instructions from the support movement analyzer circuitry 302. The example actuator movement analyzer circuitry 304 determines an adjustment to a height of the pad 210 by the actuator 120 to maintain the pad 210 at a static height despite oscillatory motions thereof. In some examples, the actuator movement analyzer circuitry 304 provides signals to the actuator(s) 120 to maintain the pad 210 at a mean and/or baseline height while enabling movement (e.g., oscillatory movement, periodic movement, etc.) of the pad 210 above a threshold frequency that is centered at the aforementioned mean and/or control height. Additionally or alternatively, the actuator movement analyzer circuitry 304 controls the actuator(s) 120 to modify a response and/or behavior of the spring 212 by counteracting a force and/or movement of the spring 212. In particular, the actuator movement analyzer circuitry 304 can operate as a spring-cancelling device such that. In some examples, the actuator movement analyzer circuitry 304 is instantiated by processor circuitry executing actuator movement analyzer circuitry instructions and/or configured to perform operations such as those represented by the flowcharts of FIGS. 4-6.

In some examples, the example flight input analyzer circuitry 306 is implemented to determine and/or analyze flight input from the aircraft controls 114 shown in FIG. 1. For example, the flight input analyzer circuitry 306 determines the flight input for causing movement of the control surfaces 108. In some such examples, the flight input analyzer circuitry 306 is instantiated by processor circuitry executing flight input analyzer circuitry instructions and/or configured to perform operations such as those represented by the flowcharts of FIGS. 4-6.

The example control surface analyzer circuitry 308 can be implemented to analyze and/or determine resultant movement of the control surfaces 108 based on the aforementioned flight input. In some examples, the control surface analyzer circuitry 308 is instantiated by processor circuitry executing control surface analyzer circuitry instructions and/or configured to perform operations such as those represented by the flowcharts of FIGS. 4-6.

According to examples disclosed herein, the aircraft response analyzer circuitry 310 is implemented. For example, the aircraft response analyzer circuitry 310 can be utilized to characterize resultant behavior (e.g., resultant movement) of the aircraft 102 in response to the flight inputs and/or movement of the control surfaces 108. In some such examples, the aircraft response analyzer circuitry 310 determines a transfer function associated with the flight inputs causing movement of the control surfaces 108 and, in turn, resultant movement of the aircraft 102. In some examples, the aircraft response analyzer circuitry 310 is instantiated by processor circuitry executing aircraft response analyzer circuitry instructions and/or configured to perform operations such as those represented by the flowcharts of FIGS. 4-6.

The example aircraft placement analyzer circuitry 312 is implemented to determine a presence of the aircraft 102 on the pads 210. In particular, the example aircraft placement analyzer circuitry 312 can determine whether the wheel 204 and/or portion of a landing gear is placed on (e.g., centered relative to, centered to a requisite degree to, etc.) at least one of the pads 210. In some examples, the aircraft placement analyzer circuitry 312 is instantiated by processor circuitry executing aircraft placement analyzer circuitry instructions and/or configured to perform operations such as those represented by the flowcharts of FIGS. 4-6.

While an example manner of implementing the controller 110 of FIG. 1 is illustrated in FIG. 3, one or more of the elements, processes, and/or devices illustrated in FIG. 3 may be combined, divided, re-arranged, omitted, eliminated, and/or implemented in any other way. Further, the example support movement analyzer circuitry 302, the example movement analyzer circuitry 304, example flight input analyzer circuitry 306, the example control surface analyzer circuitry 308, the example aircraft response analyzer circuitry 310, the example aircraft placement analyzer circuitry 312, and/or, more generally, the example controller 110 of FIG. 1, may be implemented by hardware alone or by hardware in combination with software and/or firmware. Thus, for example, any of the example support movement analyzer circuitry 302, the example movement analyzer circuitry 304, example flight input analyzer circuitry 306, the example control surface analyzer circuitry 308, the example aircraft response analyzer circuitry 310, and/or, more generally, the example controller 110, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example controller 110 of FIG. 1 may include one or more elements, processes, and/or devices in addition to, or instead of, those illustrated in FIG. 3, and/or may include more than one of any or all of the illustrated elements, processes and devices.

Figure 4:
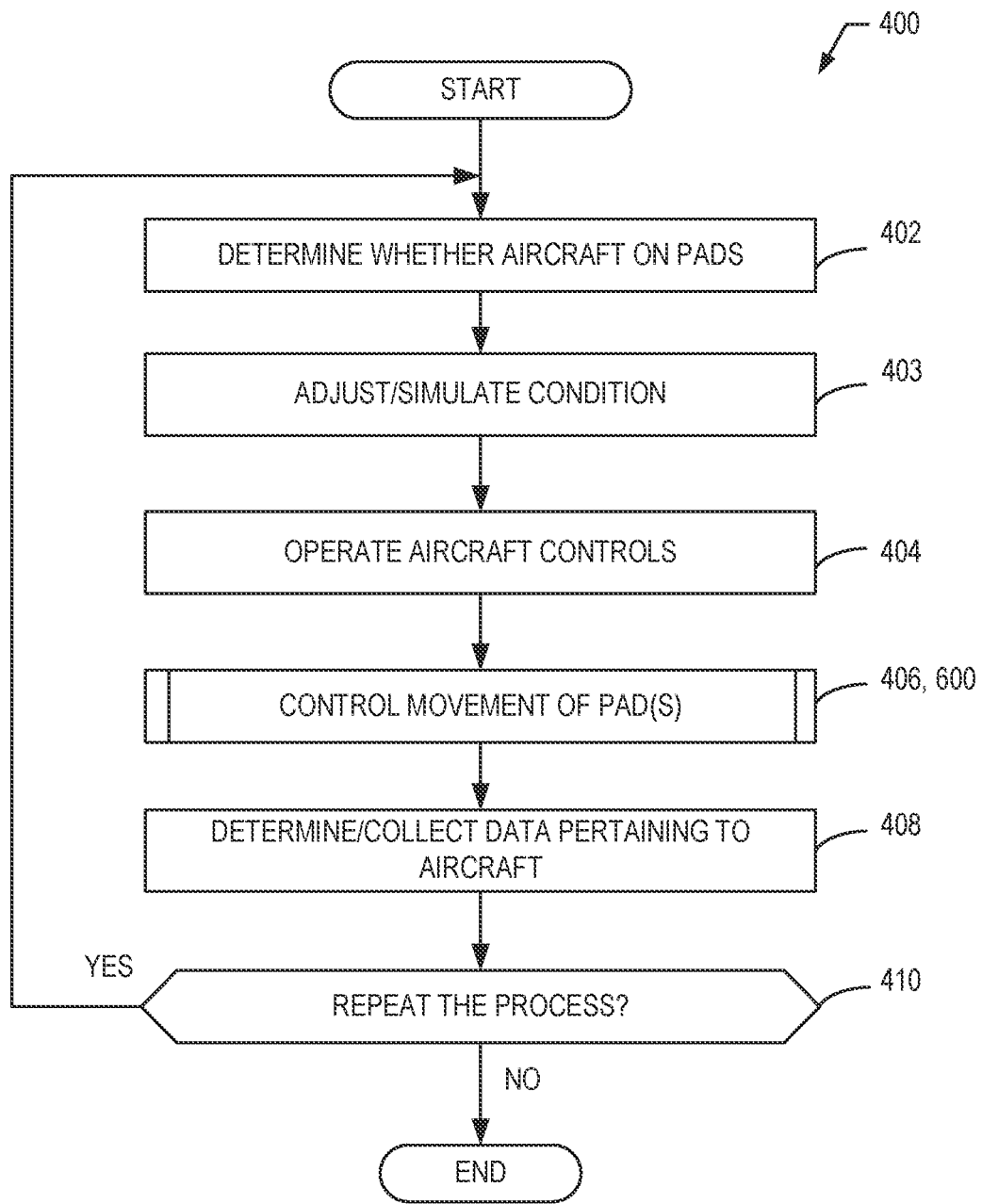
FIGS. 4-6 are flowcharts representative of example machine readable instructions and/or example operations that may be executed by example processor circuitry to implement the example variable stiffness support testing system of FIG. 1 and/or the example controller of FIG. 3.
Figure 5:
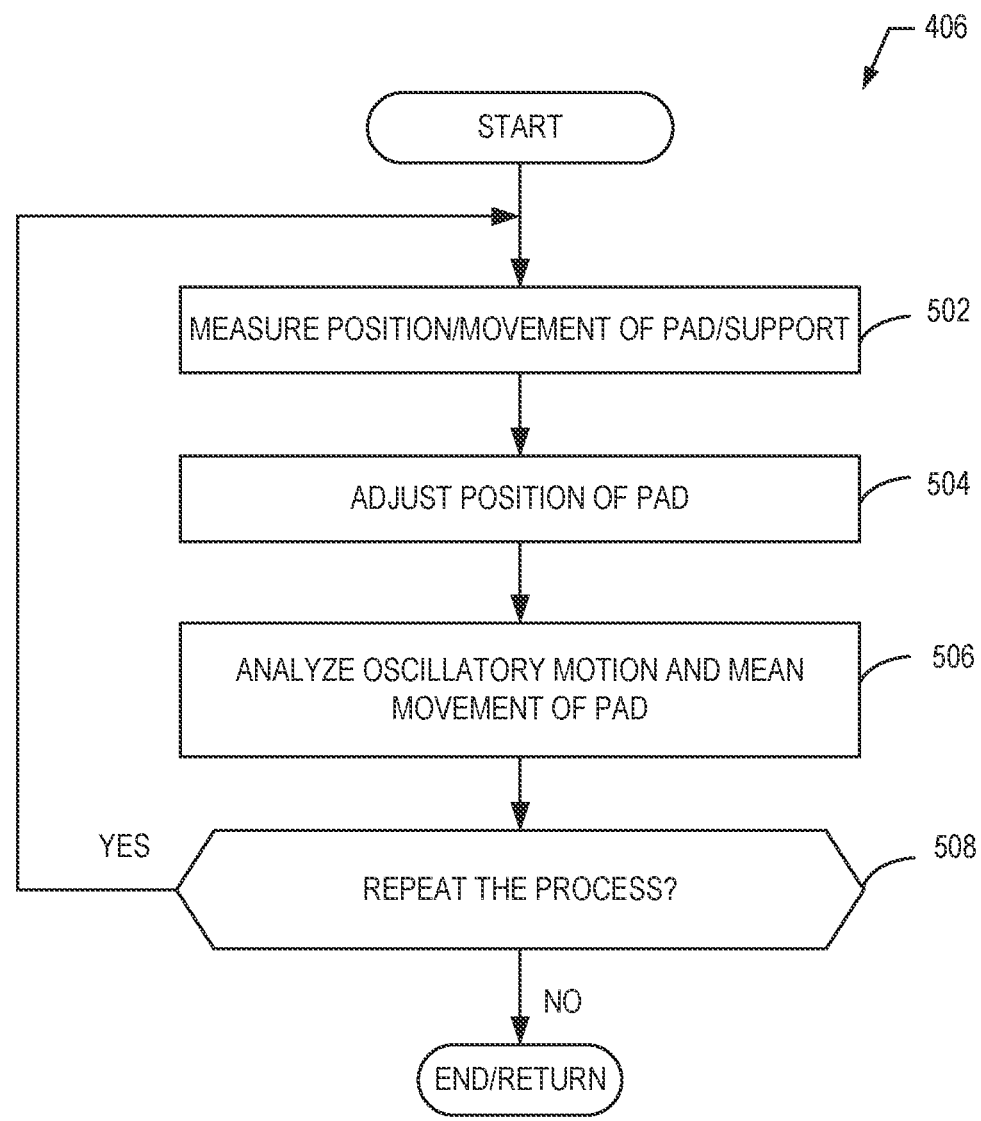
Figure 6:
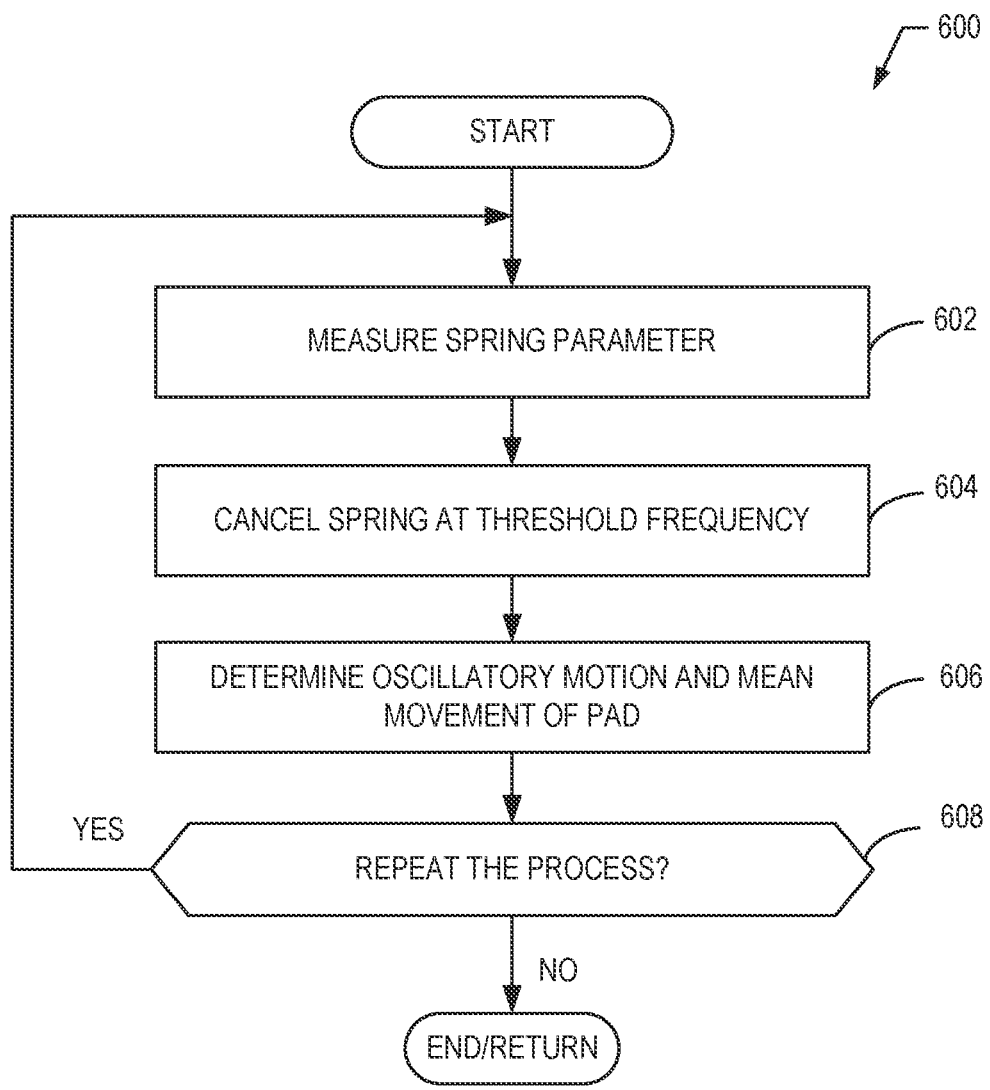

Flowcharts representative of example hardware logic circuitry, machine readable instructions, hardware implemented state machines, and/or any combination thereof for implementing the controller 110 of FIG. 1 are shown in FIGS. 4-6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 4-6, many other methods of implementing the example controller 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 4-6 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIGS. 4-6 are flowcharts representative of example machine readable instructions and/or example operations 400 that may be executed and/or instantiated by processor circuitry to actively control movement of the pad 210. The machine readable instructions and/or the operations 400 of FIG. 4 begin at block 402, at which the example aircraft placement analyzer circuitry 312 determines whether the aircraft 102 is positioned to be supported by the pads 120. In particular, the example aircraft placement analyzer circuitry 312 determines that wheels and/or landing gears of the aircraft 102 are positioned on respective ones of the pads 120.

At block 403, in some examples, the flight input analyzer circuitry 306, the control surface analyzer circuitry 308 and/or the aircraft response analyzer circuitry 310 causes the environment adjuster 112 to adjust conditions of the aircraft 102. For example, the environment adjuster 112 can be associated with and/or include a wind tunnel and cause air to flow past the aircraft 102 so that resultant data can be obtained from the aircraft sensor 116.

At block 404, the flight input analyzer circuitry 306 and/or the control surface analyzer circuitry 308 operates the aircraft controls 114. In some examples, the aircraft controls 114 are utilized to cause movement of the control surfaces 108 of the aircraft 102.

At block 406, movement of the pads 210 and/or the variable stiffness supports 104 is controlled by the support movement analyzer circuitry 302 and/or the actuator movement analyzer circuitry 304. In this example, as described below in connection with FIG. 5, the support movement analyzer circuitry 302 and/or the actuator movement analyzer circuitry 304 directs the actuator 120 to maintain a static height of the pad 210 while enabling a degree of motion of the aircraft 102 and the pad 210 to occur. In this example, the support movement analyzer circuitry 302 enables motion above a threshold frequency to be transferred to the pad 210 and, in turn, the aircraft 102. Additionally or alternatively, as will be discussed in greater detail below in connection with FIG. 6, the support movement analyzer circuitry 302 and/or the actuator movement analyzer circuitry 304 controls the variable stiffness supports 104 to vary a degree to which the spring 212 interacts with the pad 210 (e.g., force, compression, movement, dampening, etc.). For example, the variable stiffness supports 104 can direct movement of the actuator 120 to cancel at least one effect of the spring 212.

At block 408, in some examples, the aircraft response analyzer circuitry 310 determines and/or collects data pertaining to the aircraft 102. For example, the aircraft response analyzer circuitry 310 can determine resultant motion of the aircraft 102 based on measured movement (e.g., periodic movement) of the control surfaces 108.

At block 410, it is determined by the support movement analyzer circuitry 302 and/or the aircraft placement analyzer circuitry 312 whether to repeat the process. If the process is to be repeated (block 410), control of the process returns to block 402. Otherwise, the process ends. This determination may be based on whether additional data is to be obtained, whether the aircraft 102 is on the pads 210 and/or whether another aircraft is to be analyzed.

FIG. 5 is flowchart representative of an example subroutine 406 of FIG. 4. In the illustrated example, a mean and/or baseline height of the pad 210 is maintained via the actuator 120. In particular, the actuator 120 is utilized to control a height of the pad 210 while the spring 212 is operatively coupled thereto, thereby enabling at least a portion of the aircraft 102 to move to some degree relative (e.g., move in a periodic and/or sinusoidal motion) to the controlled height of the pad 210.

At block 502, the support movement analyzer circuitry 302 directs the sensor 118 to measure a position (e.g., a relative position), displacement and/or movement of the pad 210. For example, the support movement analyzer circuitry 302 can direct the sensor 118 to measure a relative height between a surface of the pad 210 that contacts the aircraft 102 (e.g., the wheel 204 of the aircraft 102) and a floor and/or structure of a building. Additionally or alternatively, the support movement analyzer circuitry 302 directs the sensor 118 to measure a height between the pad 210 and at least one surface (e.g., a bottom surface) of the aircraft 102.

At block 504, the actuator movement analyzer circuitry 304 of the illustrated example directs the actuator 120 to move and/or adjust a height of the pad 210 while the pad 210 supports at least a portion of the aircraft 102. In this example, the height of the pad 210 is adjusted based on the measured height from the sensor 118, thereby enabling the pad 210 to statically support the aircraft 102 while enabling motion of the pad 210 that exceeds a frequency threshold.

At block 506, in some examples, the support movement analyzer circuitry 302 and/or the actuator movement analyzer circuitry 304 analyzes and/or determines oscillatory motion of the pad 210 and/or movement of the pad 210 relative to its mean position (e.g., baseline height).

At block 508, the support movement analyzer circuitry 302 and/or the actuator movement analyzer circuitry 304 determines whether to repeat the process. If the process is to be repeated (block 508), control of the process returns to block 502. Otherwise, the process ends/returns. This determination may be based on whether additional adjustments to the height of the pad 210 and/or at least a portion of the aircraft 102 are necessitated.

FIG. 6 is flowchart representative of an alternative subroutine 600 that can be utilized instead of the example subroutine 406 shown in FIGS. 4 and 5. In the illustrated example, force output and/or dampening of the spring 212 is controlled. In particular, the actuator 120 is utilized to control a height of the pad 210 such that output of the spring 212 is controlled. For example, force output and/or dampening of the spring 212 can be canceled to a certain degree. As a result, at least a portion of the aircraft 102 can move to some degree relative (e.g., move in a periodic and/or sinusoidal motion) to the controlled height of the pad 210. In this example, operation of the spring 212 is not canceled as the aircraft 102 is brought onto the pads 210. However, for testing of the aircraft 102, the spring 212 is canceled to a controlled degree for testing of the aircraft 102. In other words, the spring(s) 212 remain at sufficient stiffness as the aircraft 102 is rolled onto the pads 210 but the spring(s) 212 operate at a reduced stiffness during testing of the aircraft 102.

At block 602, the support movement analyzer circuitry 302 directs the sensor 118 to measure at least one parameter of the spring 212. For example, the support movement analyzer circuitry 302 can direct the sensor 118 to measure a compression of the spring 212 (e.g., based on a displacement of the spring 212 and/or the pad 210). Additionally or alternatively, a dampening behavior of the spring 212 is measured by the sensor 118.

At block 604, the actuator movement analyzer circuitry 304 of the illustrated example directs the actuator 120 to cancel and/or adjust the spring 212 (e.g., adjust effective properties of the spring 212). In this example, the height of the pad 210 varies a degree to which the spring 212 is compressed (as well as a degree to which the spring 212 provides force and dampening), thereby enabling the pad 210 to statically support the aircraft 102 while enabling motion of the pad 210 that exceeds a frequency threshold.

At block 606, in some examples, the support movement analyzer circuitry 302 and/or the actuator movement analyzer circuitry 304 analyzes and/or determines oscillatory motion of the pad 210 and/or the spring 212. In such examples, the oscillatory motion is analyzed to characterize the baseline height of the pad 210.

At block 608, the support movement analyzer circuitry 302 and/or the actuator movement analyzer circuitry 304 determines whether to repeat the process. If the process is to be repeated (block 608), control of the process returns to block 602. Otherwise, the process ends/returns. This determination may be based on whether additional adjustments to the spring 212 are necessitated.

Figure 7:
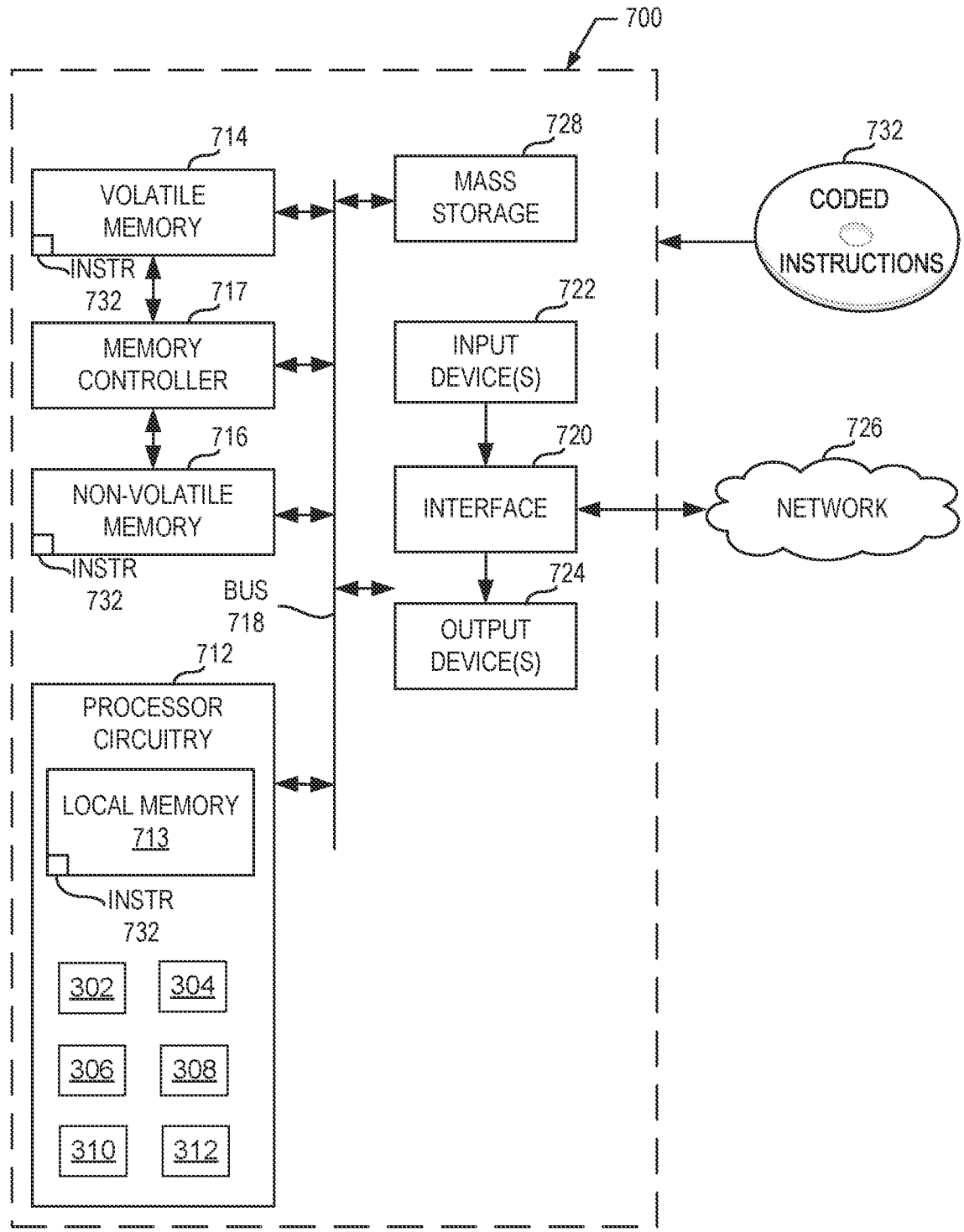
FIG. 7 is a block diagram of an example processing platform including processor circuitry structured to execute the example machine readable instructions and/or the example operations of FIGS. 4-6 to implement the example variable stiffness support testing system of FIG. 1 and/or the example controller of FIG. 3.

FIG. 7 is a block diagram of an example processor platform 700 structured to execute and/or instantiate the machine readable instructions and/or the operations of FIGS. 4-6 to implement the controller 110 of FIG. 1. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the example support movement analyzer circuitry 302, the example actuator movement analyzer circuitry 304, the example flight input analyzer circuitry 306, the example control surface analyzer circuitry 308, the example aircraft response analyzer circuitry 310 and the example aircraft placement analyzer circuitry 312.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIGS. 4-6, may be stored in the mass storage device 728, in the volatile memory 714, in the non-volatile memory 716, and/or on a removable non-transitory computer readable storage medium such as a CD or DVD.

Figure 8:
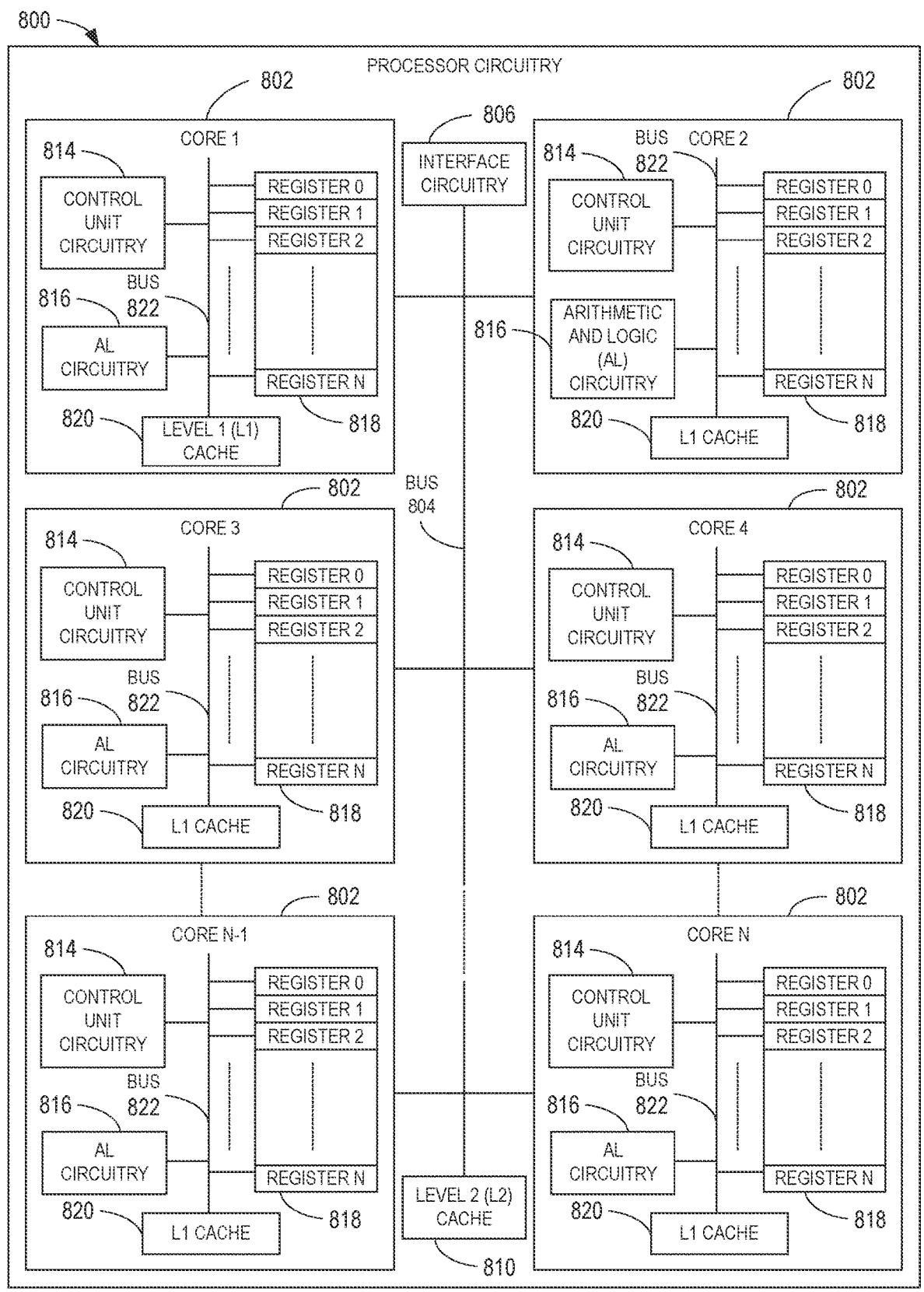
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowcharts of FIGS. 4-6 to effectively instantiate the circuitry of FIG. 3 as logic circuits to perform the operations corresponding to those machine readable instructions. In some such examples, the circuitry of FIG. 3 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowcharts of FIGS. 4-6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 5. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus.

Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
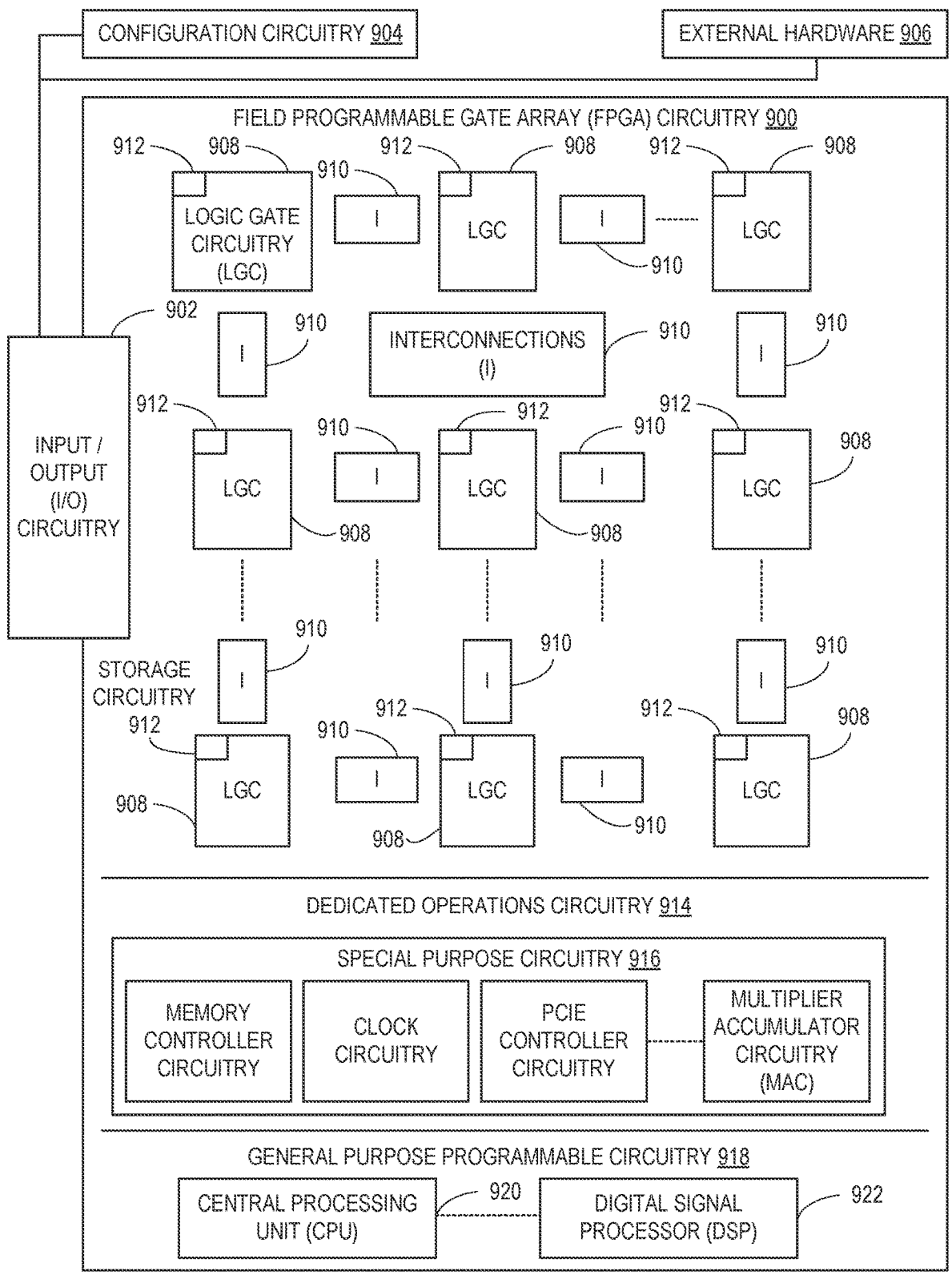
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowcharts of FIGS. 4-6 but whose interconnections and logic circuitry are fixed once fabricated), the FPGA circuitry 900 of the example of FIG. 9 includes interconnections and logic circuitry that may be configured and/or interconnected in different ways after fabrication to instantiate, for example, some or all of the machine readable instructions represented by the flowcharts of FIGS. 4-6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowcharts of FIGS. 4-6. As such, the FPGA circuitry 900 may be structured to effectively instantiate some or all of the machine readable instructions of the flowcharts of FIGS. 4-6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIGS. 4-6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIGS. 4-6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowcharts of FIGS. 4-6 may be executed by one or more of the cores 802 of FIG. 8, a second portion of the machine readable instructions represented by the flowcharts of FIGS. 4-6 may be executed by the FPGA circuitry 900 of FIG. 9, and/or a third portion of the machine readable instructions represented by the flowcharts of FIGS. 4-6 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
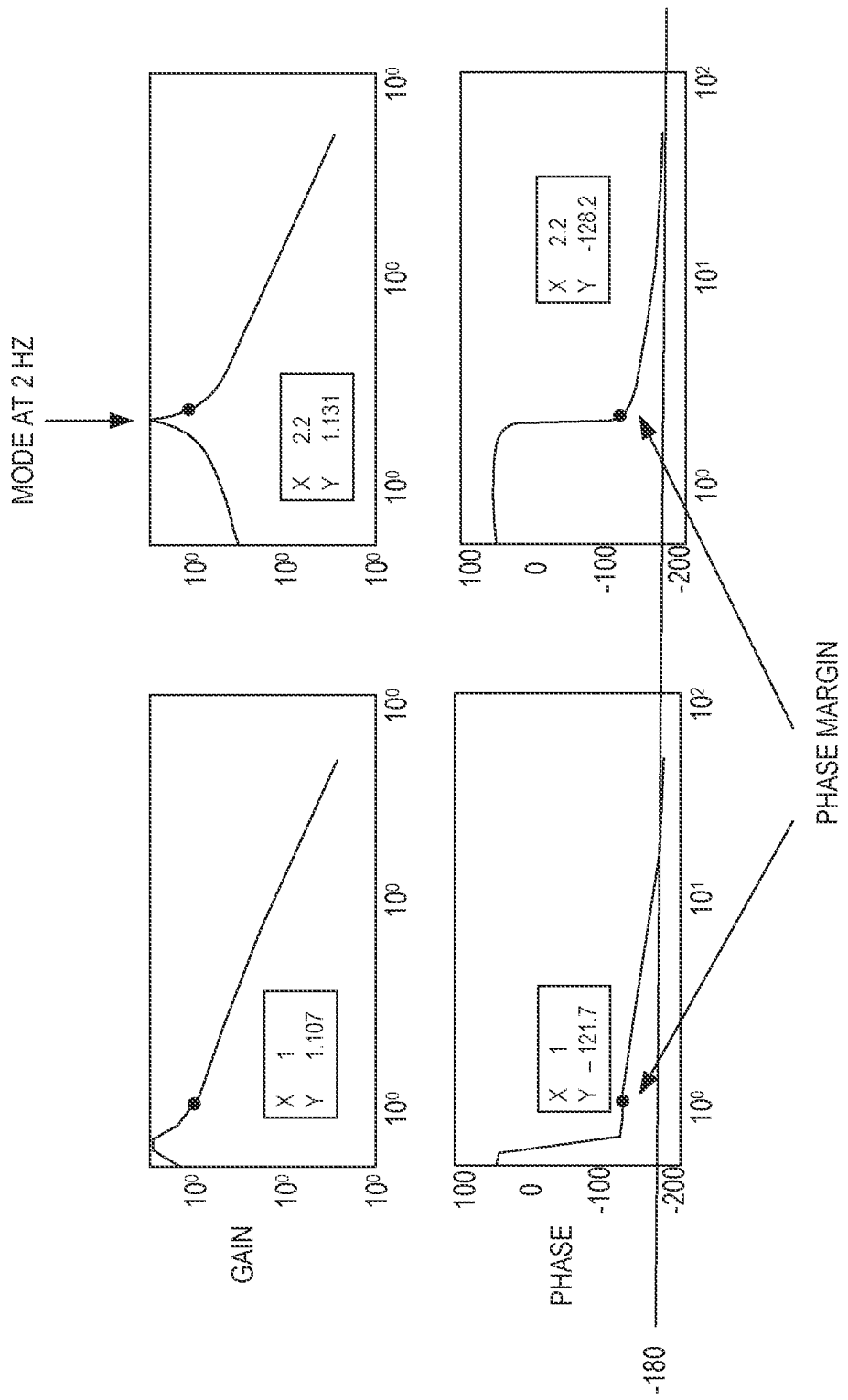
FIG. 10 depicts example characteristics of operation of an example aircraft.

FIG. 10 depicts example characteristics of operation of an example aircraft (e.g., the aircraft 102). In particular, transfer functions of the aircraft are shown. FIG. 10 illustrates an example of where a model of the aircraft is used to predict a transfer function and generate a compensator as a control law (e.g., a PI filter with lead at crossover). The resulting plots of FIG. 10 are derived from a model that is developed using a relatively soft spring (e.g., a soft spring similar to air on a left side of the aircraft and a landing gear boundary condition on a right side of the aircraft). In this example, a margin of −121.7−(−180)=58 degrees of phase margin with the soft spring suspension is shown. When the aircraft is on the ground, a rigid body roll mode of the aircraft can be excited when the transfer function is measured. In this example, a case is shown on the right side with a roll mode at 2 Hz. Use of the same compensator for the case of the aircraft on soft springs results in a reduction of phase margin to −128.2−(−180)=51.8 degrees of phase margin, for example.

A loss of phase margin when using a compensator designed for flight while testing on the ground can result in misleading behavior or instability. Such an instability can be an artifact of testing of a landing gear. Thus, for at least this reason, it can be preferable to test the aircraft on the ground under the same or similar conditions as in flight.

According to examples disclosed herein, the actuators 120, which can be implemented as differential actuators, are utilized for spring cancelling that lowers effective roll frequency to nearly the same as that of the soft spring while still maintaining the springs 212 ability to hold the aircraft at a relatively fixed vertical position (e.g., to ground or a building). These results can be accomplished by the controller 110 not implementing/executing spring cancelling via the actuator 120 at relatively low frequencies of approximately 0 Hz.

Figure 11:
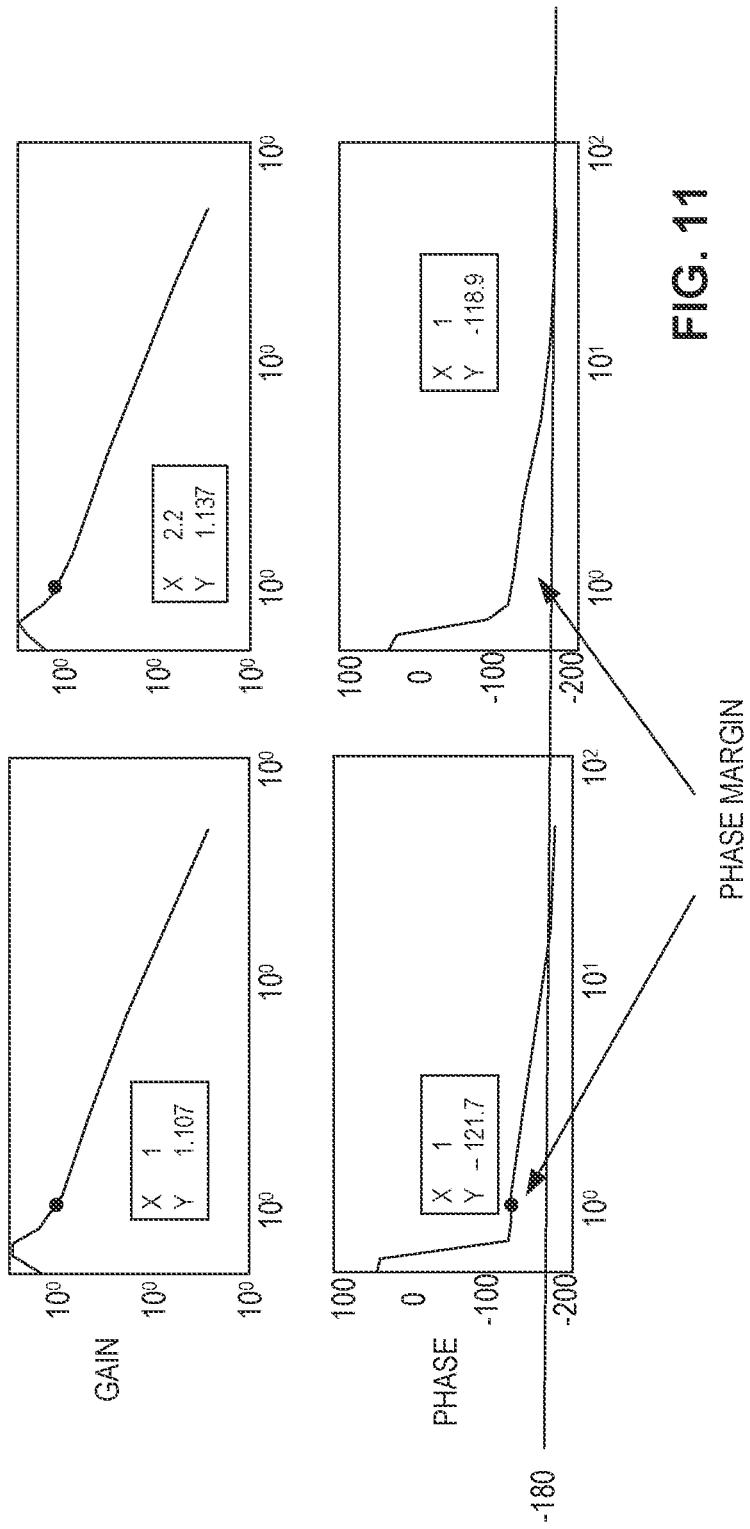
FIG. 11 depicts a comparison of known implementations with examples disclosed herein.

FIG. 11 depicts a comparison of a known implementation with examples disclosed herein. In this example, the known implementation is shown on the left side and corresponds to a soft spring system. Further, the right side of FIG. 11 corresponds to examples disclosed herein in accordance with teachings of this disclosure. As can be seen in FIG. 11, examples disclosed herein can yield results that are relatively close to use of soft spring implementations, which are typically highly representative of an aircraft under test in flight.

Example methods, apparatus, systems, and articles of manufacture to enable accurate and relatively easy to implement ground-based testing of vehicles and/or aircraft are disclosed herein. Further examples and combinations thereof include the following:

Example 1 includes an apparatus for use with an aircraft, the apparatus comprising a variable stiffness support including a pad to contact and support the aircraft, and a spring operatively coupled to the pad, an actuator operatively coupled to the support, a sensor, at least one memory, machine executable instructions, and at least one processor to execute the instructions to determine at least one of a movement or a distance of the pad based on information from the sensor, and control movement of the actuator based on the determined at least one of the movement or the distance to statically support the aircraft while enabling movement of the pad above a threshold frequency.

Example 2 includes the apparatus as defined in example 1, wherein the at least one processor is to execute the instructions to control the actuator to maintain the pad at a mean height corresponding to sinusoidal motion thereof above the threshold frequency.

Example 3 includes the apparatus as defined in any of examples 1 or 2, wherein the at least one processor is to execute the instructions to control the actuator to cancel motion of the spring below the threshold frequency.

Example 4 includes the apparatus as defined in any of examples 1 to 3, wherein the sensor is to measure the distance from the pad relative to the ground supporting the pad.

Example 5 includes the apparatus as defined in any of examples 1 to 4, wherein the sensor is to measure a height from at least a portion of the aircraft to the pad.

Example 6 includes the apparatus as defined in any of examples 1 to 5, wherein the pad is to support a wheel of a landing gear of the aircraft.

Example 7 includes the apparatus as defined in any of examples 1 to 6, wherein the actuator is to be placed onto a landing gear of the aircraft.

Example 8 includes the apparatus as defined in any of examples 1 to 7, wherein the variable stiffness support is associated with a wind tunnel to test the aircraft.

Example 9 includes a non-transitory computer readable medium comprising instructions, which when executed, cause at least one processor determine at least one of a movement or a displacement of a pad of a variable stiffness support based on information from a sensor, the pad to contact and support an aircraft, and operatively coupled to a spring, and control movement of an actuator operatively coupled to at least one of the pad or the aircraft based on the determined at least one of the movement or the displacement of the pad to statically support the aircraft while enabling movement of the pad above a threshold frequency.

Example 10 includes the non-transitory computer readable medium as defined in example 9, wherein the instructions cause the at least one processor to maintain the pad at a mean height corresponding to sinusoidal motion thereof above the threshold frequency.

Example 11 includes the non-transitory computer readable medium as defined in any of examples 9 or 10, wherein the instructions cause the at least one processor to determine whether a landing gear of the aircraft is placed onto the pad and enable movement of the actuator based on the aircraft being placed onto the pad.

Example 12 includes the non-transitory computer readable medium as defined in any of examples 9 to 11, wherein the instructions cause the at least one processor to determine an oscillatory motion of the aircraft to determine an adjustment to the pad via the actuator.

Example 13 includes the non-transitory computer readable medium as defined in any of examples 9 to 12, wherein the instructions cause the at least one processor to determine a degree of compression of the spring to control the movement of the actuator.

Example 14 includes the non-transitory computer readable medium as defined in any of examples 9 to 13, wherein the instructions cause the at least one processor to cancel motion of the spring for movement of the pad below the threshold frequency to control the movement of the actuator.

Example 15 includes the non-transitory computer readable medium as defined in any of examples 9 to 14, wherein the instructions cause the at least one processor to cancel compression of the spring for movement of the pad below the threshold frequency to control the movement of the actuator.

Example 16 includes the non-transitory computer readable medium as defined in any of examples 9 to 15, wherein the instructions cause the at least one processor to obtain data associated with the aircraft being positioned in a wind tunnel.

Example 17 includes a method comprising determining, by executing instructions with at least one processor, at least one of a movement or a displacement of a pad of a variable stiffness support based on information from a sensor, the pad to contact and support an aircraft, and operatively coupled to a spring, and controlling, by executing instructions with the at least one processor, movement of an actuator operatively coupled to at least one of the pad or the aircraft based on the determined at least one of the movement or the displacement of the pad to statically support the aircraft while enabling movement of the pad above a threshold frequency.

Example 18 includes the method as defined in example 17, further including maintaining, by executing instructions with the at least one processor, the pad at a mean height corresponding to sinusoidal motion thereof above the threshold frequency.

Example 19 includes the method as defined in any of examples 17 or 18, further including determining, by executing instructions with the at least one processor, whether a landing gear of the aircraft is placed onto the pad to enable movement of the actuator.

Example 20 includes the method as defined in any of examples 17 to 19, further including determining, by executing instructions with the at least one processor, an oscillatory motion of the aircraft to determine an adjustment to the pad via the actuator.

Example 21 includes the method as defined in any of examples 17 to 20, further including determining, by executing instructions with the at least one processor, a degree of compression of the spring.

Example 22 includes the method as defined in any of examples 17 to 21, further including cancelling, by executing instructions with the at least one processor, motion of the spring for movement of the pad below the threshold frequency.

From the foregoing, it will be appreciated that example systems, methods, apparatus, and articles of manufacture have been disclosed that enable accurate and controlled ground/facility testing of aircraft. Examples disclosed herein can reliably statically support an aircraft while realistically simulating flight conditions. Examples disclosed herein can also reduce a need for in-flight testing, which can be expensive and time-consuming.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus for use with an aircraft, the apparatus comprising:
   a variable stiffness support including:
      a pad to contact and support the aircraft, and
      a spring operatively coupled to the pad;
   an actuator operatively coupled to the support;
   a sensor;
   at least one memory;
   machine executable instructions; and
   at least one processor to execute the instructions to:
      determine at least one of a movement or a distance of the pad based on information from the sensor, and
      control movement of the actuator based on the determined at least one of the movement or the distance to statically support the aircraft while enabling movement of the pad above a threshold frequency.

2. The apparatus as defined in claim 1, wherein the at least one processor is to execute the instructions to control the actuator to maintain the pad at a mean height corresponding to sinusoidal motion thereof above the threshold frequency.

3. The apparatus as defined in claim 1, wherein the at least one processor is to execute the instructions to control the actuator to cancel motion of the spring below the threshold frequency.

4. The apparatus as defined in claim 1, wherein the sensor is to measure the distance from the pad relative to the ground supporting the pad.

5. The apparatus as defined in claim 1, wherein the sensor is to measure a height from at least a portion of the aircraft to the pad.

6. The apparatus as defined in claim 1, wherein the pad is to support a wheel of a landing gear of the aircraft.

7. The apparatus as defined in claim 1, wherein the actuator is to be placed onto a landing gear of the aircraft.

8. The apparatus as defined in claim 1, wherein the variable stiffness support is associated with a wind tunnel to test the aircraft.

9. A non-transitory computer readable medium comprising instructions, which when executed, cause at least one processor:
- determine at least one of a movement or a displacement of a pad of a variable stiffness support based on information from a sensor, the pad to contact and support an aircraft, and operatively coupled to a spring; and
- control movement of an actuator operatively coupled to at least one of the pad or the aircraft based on the determined at least one of the movement or the displacement of the pad to statically support the aircraft while enabling movement of the pad above a threshold frequency.

10. The non-transitory computer readable medium as defined in claim 9, wherein the instructions cause the at least one processor to maintain the pad at a mean height corresponding to sinusoidal motion thereof above the threshold frequency.

11. The non-transitory computer readable medium as defined in claim 9, wherein the instructions cause the at least one processor to determine whether a landing gear of the aircraft is placed onto the pad and enable movement of the actuator based on the aircraft being placed onto the pad.

12. The non-transitory computer readable medium as defined in claim 9, wherein the instructions cause the at least one processor to determine an oscillatory motion of the aircraft to determine an adjustment to the pad via the actuator.

13. The non-transitory computer readable medium as defined in claim 9, wherein the instructions cause the at least one processor to determine a degree of compression of the spring to control the movement of the actuator.

14. The non-transitory computer readable medium as defined in claim 9, wherein the instructions cause the at least one processor to cancel motion of the spring for movement of the pad below the threshold frequency to control the movement of the actuator.

15. The non-transitory computer readable medium as defined in claim 9, wherein the instructions cause the at least one processor to cancel compression of the spring for movement of the pad below the threshold frequency to control the movement of the actuator.

16. The non-transitory computer readable medium as defined in claim 9, wherein the instructions cause the at least one processor to obtain data associated with the aircraft being positioned in a wind tunnel.

17. A method comprising:
- determining, by executing instructions with at least one processor, at least one of a movement or a displacement of a pad of a variable stiffness support based on information from a sensor, the pad to contact and support an aircraft, and operatively coupled to a spring; and
- controlling, by executing instructions with the at least one processor, movement of an actuator operatively coupled to at least one of the pad or the aircraft based on the determined at least one of the movement or the displacement of the pad to statically support the aircraft while enabling movement of the pad above a threshold frequency.

18. The method as defined in claim 17, further including maintaining, by executing instructions with the at least one processor, the pad at a mean height corresponding to sinusoidal motion thereof above the threshold frequency.

19. The method as defined in claim 17, further including determining, by executing instructions with the at least one processor, whether a landing gear of the aircraft is placed onto the pad to enable movement of the actuator.

20. The method as defined in claim 17, further including determining, by executing instructions with the at least one processor, an oscillatory motion of the aircraft to determine an adjustment to the pad via the actuator.

21. The method as defined in claim 17, further including determining, by executing instructions with the at least one processor, a degree of compression of the spring.

22. The method as defined in claim 17, further including cancelling, by executing instructions with the at least one processor, motion of the spring for movement of the pad below the threshold frequency.

* * * * *